United States Patent
Chandra et al.

(10) Patent No.: US 11,178,537 B2
(45) Date of Patent: Nov. 16, 2021

(54) DATA ITEM TRANSFER BETWEEN MOBILE DEVICES

(71) Applicant: International Business Machines Corporation, Armonk, NY (US)

(72) Inventors: Dusi Sarath Chandra, Bengaluru (IN); Sulakshan Vajipayajula, Bengaluru (IN); Sreekanth Ramakrishna Iyer, Bengaluru (IN); Kartik Srinivasan, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/255,997

(22) Filed: Jan. 24, 2019

(65) Prior Publication Data

US 2020/0245130 A1  Jul. 30, 2020

(51) Int. Cl.
*H04W 8/24* (2009.01)
*H04W 4/02* (2018.01)
(Continued)

(52) U.S. Cl.
CPC ........... *H04W 8/24* (2013.01); *H04L 67/1042* (2013.01); *H04L 67/1068* (2013.01); *H04W 4/023* (2013.01); *H04W 36/0038* (2013.01)

(58) Field of Classification Search
CPC ..... H04W 8/24; H04W 4/23; H04W 36/0038; H04W 4/023; H04W 12/63; H04W 12/37; H04W 8/14; H04W 8/02; H04L 67/1042; H04L 67/1068; H04L 67/1069; H04L 67/10; H04L 67/18
See application file for complete search history.

(56) References Cited

U.S. PATENT DOCUMENTS 8,613,070 B1 * 12/2013 Borzycki ................ H04L 67/10
726/8
8,694,597 B1   4/2014 Raj et al.
(Continued)

FOREIGN PATENT DOCUMENTS

WO    2008084386 A4   12/2014

OTHER PUBLICATIONS

Langberg, "Blockchains in Mobile Networks," Huawei Publications, retreived Jan. 24, 2019, 10 pages. https://e.huawei.com/in/publications/global/ict_insights/201703141505/core-competency/201703150928.

*Primary Examiner* — Jae Y Lee
*Assistant Examiner* — Mohammed M Murshid
(74) *Attorney, Agent, or Firm* — Yee & Associates, P.C.

(57) ABSTRACT

Data item transfer between mobile devices is provided. Network association and proximity of a plurality of mobile devices of a requested data item by a requesting mobile device are determined using a shared ledger of mobile device inventory data, mobile device network connection data, and mobile device geolocation data. A target mobile device that contains the requested data item, is connected to a same local network as the requesting mobile device, and is geographically located proximate with a threshold to the requesting mobile device is identified based on the determined network association and proximity of the plurality of mobile devices and data in the shared ledger. A transfer of the requested data item from the target mobile device to the requesting mobile device is initiated via the same local network based on mobile device management policies.

20 Claims, 7 Drawing Sheets

(51) Int. Cl.
    *H04L 29/08*     (2006.01)
    *H04W 36/00*     (2009.01)

(56) References Cited

U.S. PATENT DOCUMENTS

| | | | |
|---|---|---|---|
| 2005/0216901 A1* | 9/2005 | Speare | G06F 21/606 |
| | | | 717/168 |
| 2008/0102816 A1* | 5/2008 | Shan | H04W 8/02 |
| | | | 455/424 |
| 2008/0248779 A1* | 10/2008 | Tsui | H02J 7/32 |
| | | | 455/408 |
| 2012/0309425 A1* | 12/2012 | El Khayat | H04L 67/18 |
| | | | 455/456.3 |
| 2012/0330887 A1 | 12/2012 | Young et al. | |
| 2014/0258366 A1* | 9/2014 | L'Heureux | H04L 67/1085 |
| | | | 709/203 |
| 2017/0019470 A1 | 1/2017 | Balasubramanian et al. | |
| 2017/0111336 A1* | 4/2017 | Davis | H04L 67/02 |
| 2017/0272899 A1* | 9/2017 | El Khayat | H04L 67/18 |
| 2018/0213043 A1 | 7/2018 | Ravishankar et al. | |
| 2018/0234481 A1 | 8/2018 | Bostick et al. | |
| 2019/0372825 A1* | 12/2019 | Suga | H04L 41/0893 |

* cited by examiner

DATA ITEM TRANSFER BETWEEN MOBILE DEVICES

BACKGROUND

1. Field

The disclosure relates generally to mobile device management and more specifically to optimizing autonomous data item transfer between mobile devices registered with a mobile device management server based on mobile device and data item attributes, operating environment characteristics, and values derived using mobile device management data shared via a ledger.

2. Description of the Related Art

Mobile device management is software that allows information technology (IT) administrators to control, secure, and enforce policies on mobile devices, such as, for example, smartphones, personal digital assistants, laptop computers, handheld computers, Internet of Things devices, and other similar mobile devices, being used in an enterprise across multiple mobile service providers and across multiple mobile operating systems. Mobile device management is a core component of enterprise mobility management, which also includes mobile application management, identity, and access management and enterprise file synchronization and sharing. The intent of mobile device management is to centrally manage and optimize the functionality and security of mobile devices within an enterprise, while simultaneously protecting the corporate network.

In other words, mobile device management enables an enterprise to deploy and support corporate resources, such as applications, files, documents, and other data, to mobile devices while maintaining a desired level of IT control across multiple disparate platforms. Mobile device management is one way that an enterprise can deliver secure mobile solutions to the enterprise's bring your own device workforce. Mobile device management features may include, for example: mobile device inventory and tracking; application distribution; remote wipe; password enforcement; application whitelisting and blacklisting; and data encryption enforcement.

SUMMARY

According to one illustrative embodiment, a computer-implemented method for data item transfer between mobile devices is provided. Network association and proximity of a plurality of mobile devices of a requested data item by a requesting mobile device are determined using a shared ledger of mobile device inventory data, mobile device network connection data, and mobile device geolocation data. A target mobile device that contains the requested data item, is connected to a same local network as the requesting mobile device, and is geographically located proximate with a threshold to the requesting mobile device is identified based on the determined network association and proximity of the plurality of mobile devices and data in the shared ledger. A transfer of the requested data item from the target mobile device to the requesting mobile device is initiated via the same local network based on mobile device management policies. According to other illustrative embodiments, a computer system and computer program product for data item transfer between mobile devices are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
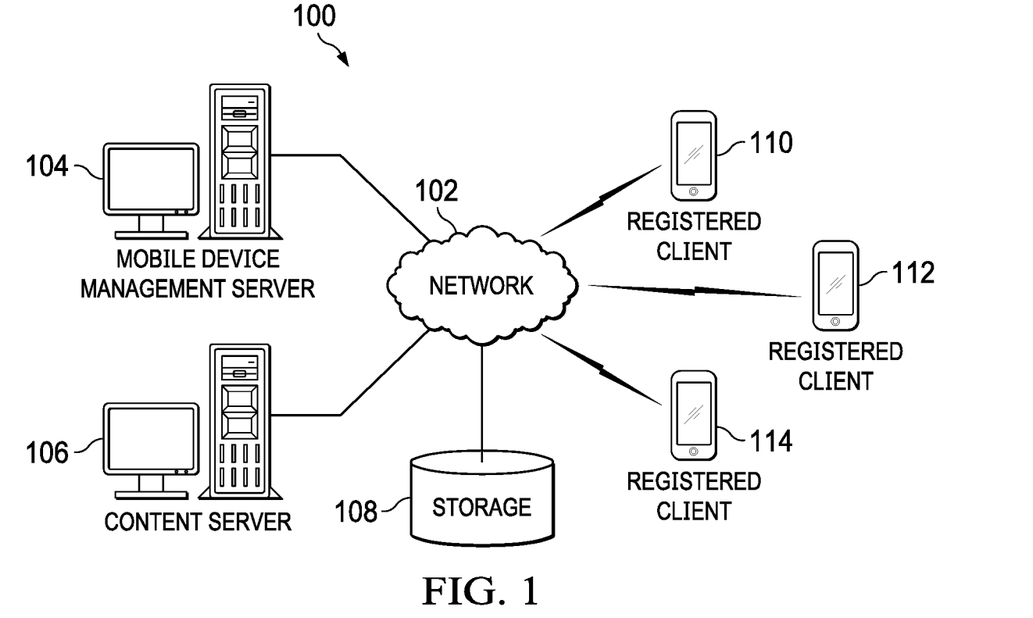
FIG. 1 is a pictorial representation of a network of data processing systems in which illustrative embodiments may be implemented.
Figure 2:
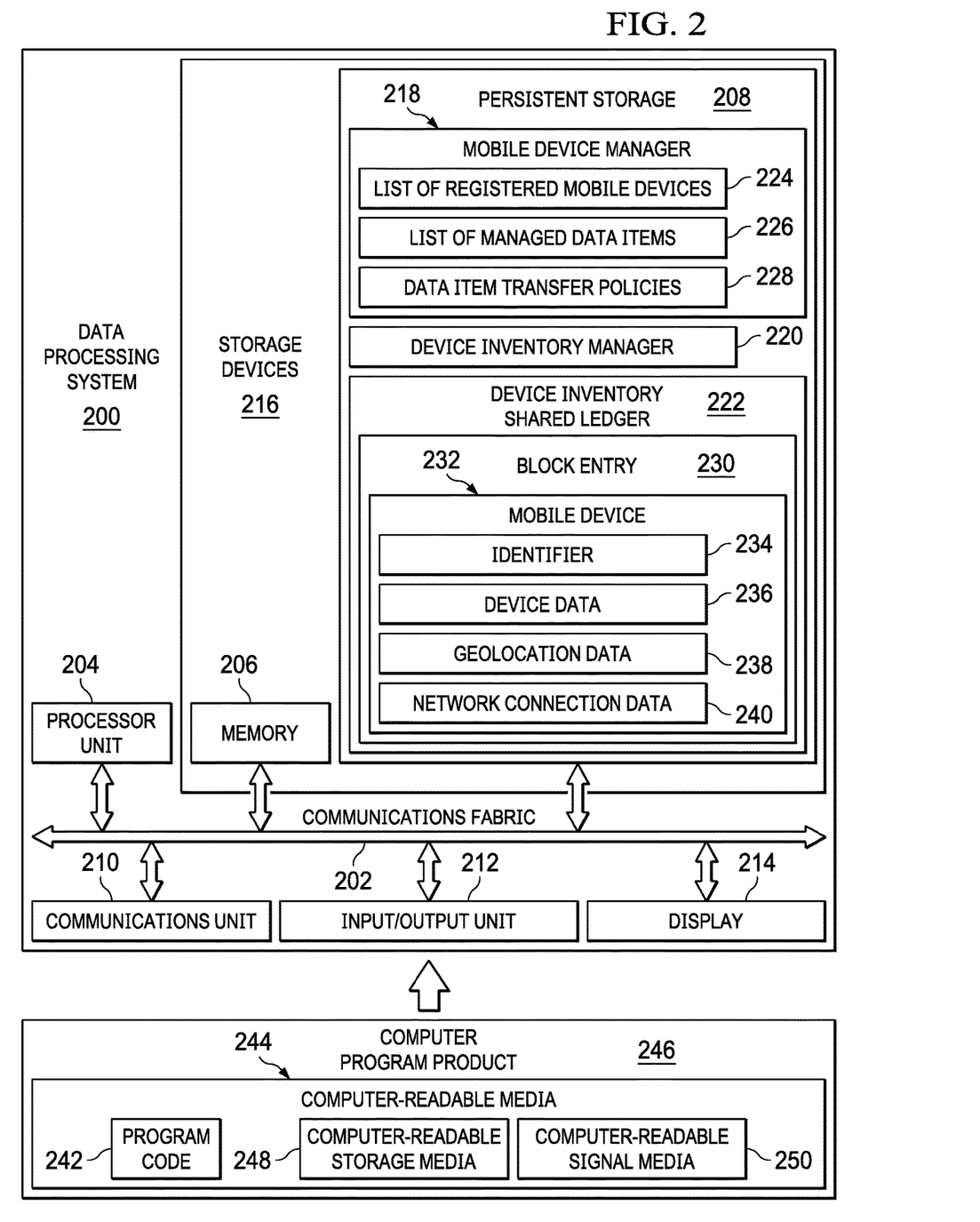
FIG. 2 is a diagram of a data processing system in which illustrative embodiments may be implemented.
Figure 3:
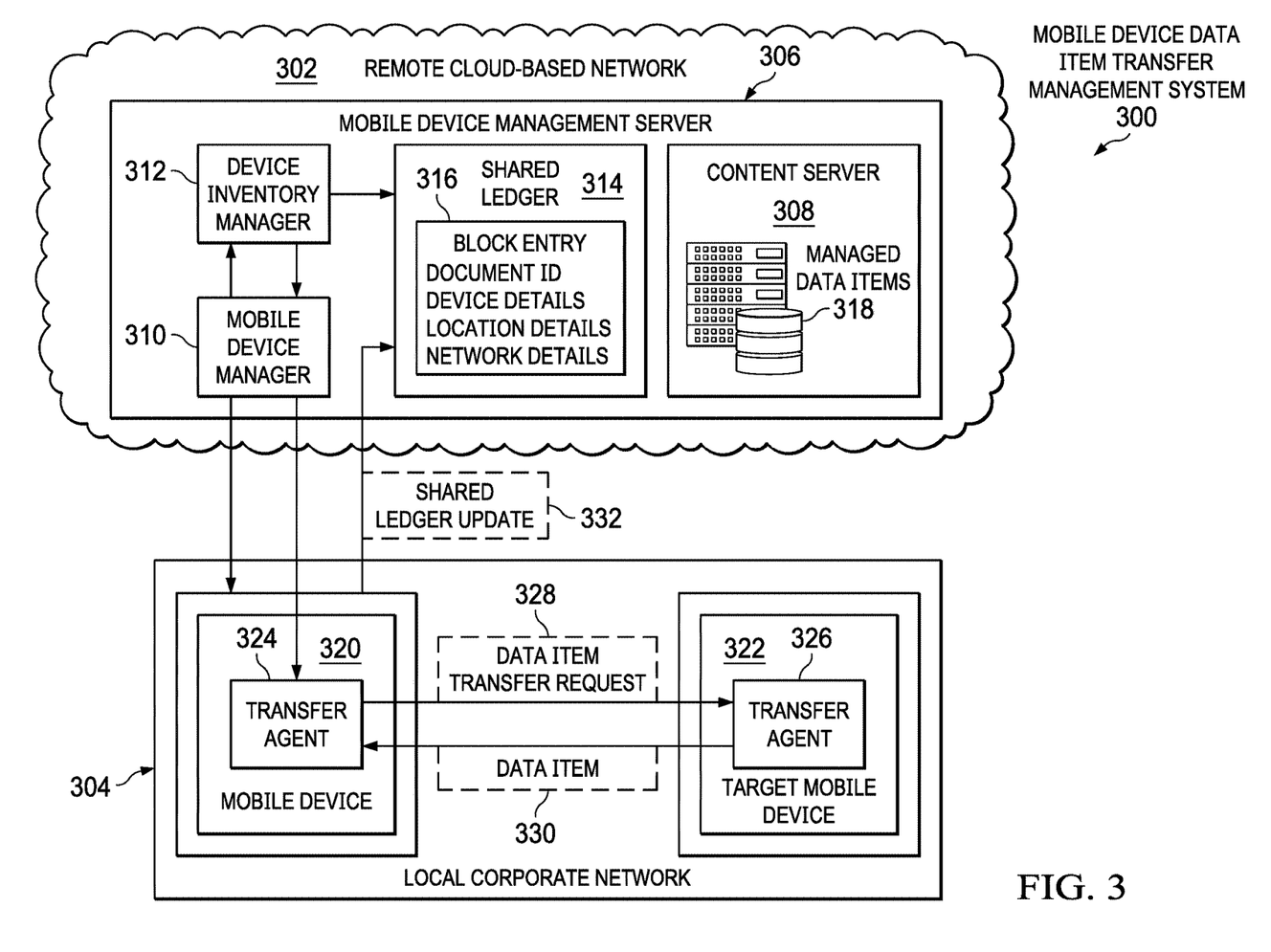
FIG. 3 is a diagram illustrating an example of a mobile device data item transfer management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Also, it should be noted that server 104 and server 106 may represent a plurality of servers in a data center. Alternatively, server 104 and server 106 may represent a plurality of computing nodes in a cloud environment.

In addition, server 104 is a mobile device management server for registered client devices. Mobile device management server 104 controls the process of transferring managed data items, such as, for example, applications, files, multimedia content, documents, data, and the like, between registered client devices via peer-to-peer data item transfer. Further, it should be noted that the managed data items correspond to a particular entity, such as, for example, a particular enterprise, organization, agency, or institution. Furthermore, server 106 is a content server. Content server 106 provides storage of managed data items corresponding to the entity. Also, content server 106 may deliver a new or updated data item to a registered client device when the new or updated data item is not available for peer-to-peer transfer from another registered client device in close geographic proximity to the registered client device.

Client 110, client 112, and client 114 also connect to network 102. Clients 110, 112, and 114 are registered clients or managed devices of mobile device management server 104. The content shared with registered clients is stored in content server 106 and the distribution of the content is controlled by policies set in mobile device management server 104. Further, it should be noted that registered clients 110, 112, and 114 also correspond to the entity associated with the managed data items. In this example, registered clients 110, 112, and 114 are shown as smart phones with wireless communication links to network 102. However, it should be noted that registered clients 110, 112, and 114 are examples only and may represent other types of mobile data processing systems, such as, for example, personal digital assistants, laptop computers, handheld computers, smart watches, and the like. Users of registered clients 110, 112, and 114 may utilize registered clients 110, 112, and 114 to send requests to mobile device management server 104 for transfer of new and updated data items between registered client devices.

Storage 108 is a network storage device capable of storing any type of data in a structured format or an unstructured format. In addition, storage 108 may represent a plurality of network storage devices. Further, storage 108 may store identifiers and network addresses for a plurality of different servers, identifiers and network addresses for a plurality of different registered client devices, identifiers for a plurality of different client device users, identifiers for a plurality of different managed data items, a plurality of different data item transfer policies, and the like. Furthermore, storage unit 108 may store other types of data, such as authentication or credential data that may include user names, passwords, and biometric data associated with registered client device users and system administrators, for example.

In addition, it should be noted that network data processing system 100 may include any number of additional servers, registered clients, storage devices, and other devices not shown. Program code located in network data processing system 100 may be stored on a computer readable storage medium and downloaded to a computer or other data processing device for use. For example, program code, such as, for example, a transfer agent, may be stored on a computer readable storage medium on mobile device management server 104 and downloaded to registered client 110 over network 102 for use on registered client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212 and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores mobile device manager 218, device inventory manager 220, and device inventory shared ledger 222. However, it should be noted that even though mobile device manager 218, device inventory manager 220, and device inventory shared ledger 222 are shown as separate components, in an alternative illustrative embodiment device inventory manager 220 and/or device inventory shared ledger 222 may be included in mobile device manager 218. Furthermore, even though mobile device manager 218 is illustrated as residing in persistent storage 208, in an alternative illustrative embodiment mobile device manager 218 may be a separate component of data processing system 200. For example, mobile device manager 218 may be a hardware component coupled to communication fabric 202 or a combination of hardware and software components. In another alternative illustrative embodiment, a first set of components of mobile device manager 218 may be located in data processing system 200 and a second set of components of mobile device manager 218 may be located in a second data processing system, such as, for example, registered client 110 in FIG. 1.

Mobile device manager 218 controls the process of transferring managed data items, such as applications and data, between mobile client devices, such as smart phones, which are registered with mobile device manager 218, when the registered mobile client devices are connected to the same local network. The local network may be, for example, a secure LAN corresponding to a particular entity that owns the managed data items.

In this example, mobile device manager 218 includes list of registered mobile devices 224, list of managed data items 226, and data item transfer policies 228. However, it should be noted that mobile device manager 218 may also include other information not shown. List of registered mobile devices 224 represents a listing of all mobile client devices registered with mobile device manager 218. List of managed data items 226 represents a listing of all data items corresponding to a particular entity and managed by mobile device manager 218 for transfer between devices listed within list of registered mobile devices 224. List of managed data items 226 may include, for example, documents, multimedia content, data, files, applications, or any combination thereof. Data item transfer policies 228 represent a plurality of different data item transfer policies that define how, when, and where transfer of particular data items may occur between specified registered mobile devices. For example, a data item transfer policy may define which registered mobile devices may be involved in a transfer of a particular managed data item, days and times when the transfer may occur, geographic location of where the transfer may occur, and local network where the transfer may occur.

Mobile device manager 218 utilizes device inventory manager 220 to search device inventory shared ledger 222 to identify a set of one or more registered mobile devices having a managed data item that has been requested by a particular registered mobile device that does not have the requested data item or needs an updated version of the requested data item. Device inventory manager 220 returns the identified set of registered mobile devices having the requested data item to mobile device manager 218 for selection of a best matching target mobile device for the data item transfer.

Mobile device manager 218 determines the best matching target mobile device based on information contained in a block entry, which corresponds to the target mobile device, within device inventory shared ledger 222. Device inventory shared ledger 222 may be, for example, a blockchain of a plurality of entries corresponding to mobile device data item transfer. For example, device inventory shared ledger 222 includes block entry 230. It should be noted that block entry 230 represents a plurality of different block entries corresponding to a plurality of different mobile devices in device inventory shared ledger 222.

In this example, block entry 230 lists mobile device 232. Mobile device 232 represents a particular, registered client mobile device, which is uniquely identified by identifier 234. In addition, block entry 230 corresponding to mobile device 232 includes attribute data 236, geolocation data 238, and network connection data 240.

Attribute data 236 include information corresponding to mobile device 232, such as, for example, identification of one or more managed data items within list of managed data items 226 that are contained in mobile device 232. Attribute data 236 may also include other information, such as make, model, operating system, processor, memory, storage, network device, and the like, corresponding to mobile device 232. Geolocation data 238 represent information that identifies a current geographic location of mobile device 232. Geolocation data 238 may be, for example, global positioning system coordinates. Network connection data 240 represent information that identifies the local network that mobile device 232 is currently connected to. The local network may be, for example, a secure corporate local area network.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra-high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200. In some instances, computer readable storage media 248 may not be removable from data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 242 may be downloaded over a network to persistent storage 208 from another device or data processing system through computer readable signal media 250 for use within data processing system 200. For instance, program code stored in a computer readable storage media in a data processing system may be downloaded over a network from the data processing system to data processing system 200. The data processing system providing program code 242 may be a server computer, a client computer, or some other device capable of storing and transmitting program code 242.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 248 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Enterprises use mobile device management systems to manage mobile devices used for enterprise business. Using these mobile device management systems, enterprises are able to administer security and accomplish enterprise functions via distribution of purpose-built applications. However, pushing large size applications or files may overwhelm a Software as a Service-based mobile device management system in a big enterprise. This push process is constrained by either network speed or scalability.

Illustrative embodiments utilize a mobile device inventory shared ledger to optimize the transfer of managed data items between registered mobile devices based on network connectivity and geographic proximity information corresponding to mobile devices registered with the mobile device management system. A data item may be, for example, a document, a file, an application, media content, data, or the like. The mobile device inventory shared ledger may consist of, for example, a blockchain of secure records. A blockchain is a growing list of records called blocks, which are linked using cryptography. Each block contains a cryptographic hash of the previous block, a timestamp, and event or transaction data, which is typically represented as a Merkel tree root hash. The cryptographic hash of the previous block contained within the current block, links the two blocks. These linked blocks form a blockchain. This iterative process confirms the integrity of the previous block, all the way back to the original genesis block. Thus, by design, a blockchain is resistant to modification of the stored data. Illustrative embodiments update the shared ledger with current real-time mobile device data item inventory information. Thus, illustrative embodiments provide an improved and effective way to transfer data items between mobile devices using a mobile device management system and shared ledger.

In addition, illustrative embodiments enable reduced common network bandwidth usage via inter-device data item transfer. Illustrative embodiments provide the mobile device management system with a set of default policies, rules, or permissions for managing transfer of data items between registered mobile devices. A data item transfer policy may be, for example, that a particular data item (e.g., corporate financial document) may only be transferred between certain registered mobile devices (e.g., mobile devices corresponding to corporate executives) located in a particular geographic location (e.g., corporate headquarters) when connected to the secure corporate local area network at specified days and times (e.g., scheduled corporate work days and hours). In addition, a user, such as, for example, a system administrator or security analyst, may define data item transfer policies, rules, or permissions for the mobile device management system. It should be noted that the mobile device management system has administrative privileges on registered mobile devices via a data item transfer agent installed on each registered mobile device. The mobile device management system installs the data item transfer agent on each registered mobile device. The mobile device management agent or optionally the data item transfer agent deployed in the mobile device, helps build a shared ledger of mobile device data item inventory data. The mobile device data item inventory data include managed data items, such as, for example, applications, files, multimedia content, documents, data, and the like, which can be transferred between registered mobile devices via a peer-to-peer data item transfer.

For each managed data item, illustrative embodiments generate an initial entry in the shared ledger for registered mobile devices having that managed data item, which corresponds to a specific entity, such as an enterprise, organization, institution, or agency. In other words, the shared ledger contains an initial block entry for each data item, along with identification of registered mobile devices containing that particular data item. When a registered mobile device connected to the secure local network requests a new or updated data item, the mobile device management system of illustrative embodiments intercepts the request at the local network level. For that particular request, the mobile device management system determines network connectivity information corresponding to the requesting mobile device from the shared ledger and determines a target registered mobile device based on its connectivity to the secure local network and geographic proximity to the requesting mobile device. It should be noted that change of state of a requested data item in the shared ledger is initiated by any registered entity and device.

Then, the mobile device management system of illustrative embodiments initiates a new operational flow to transfer that particular data item from the target mobile device to the requesting mobile device. The mobile device management system accomplishes an optimized and secure data item transfer between registered mobile devices via initiation of an inter-device data item transfer. As soon as the requesting mobile device receives the requested data item, illustrative embodiments generate a new shared ledger block entry in real-time noting the transfer of the data item to the requesting mobile device. In other words, the shared ledger now contains a new block entry stating that the requesting mobile device now includes the new or updated data item. Further, illustrative embodiments also update the shared ledger whenever a state of a managed data item changes on a mobile device either through user modification or deletion, for example. Thus, illustrative embodiments transform the shared ledger to a different state or thing with each new block entry or update in real-time or near real-time.

Prior to pushing a data item to a requesting mobile device, the mobile device management system checks for existence of a block entry corresponding to that data item within the shared ledger. If the shared ledger lookup results in a matching target mobile device, which is connected to the same local network as the requesting mobile device, the mobile device management system initiates an action to send the data item from the target mobile device to the requesting mobile device. The data item transfer occurs via the secure local network without the mobile device management system having to push the data item from a cloud-based network.

As a result, illustrative embodiments provide a novel process utilizing mobile device management and inter-device transfer to improve data item sharing between registered devices within a mobile environment. Furthermore, illustrative embodiments provide immutable shared ledger block entries corresponding to a managed data item and its availability within a given local network across multiple mobile devices associated with a particular entity. Moreover, illustrative embodiments provide a non-interruptive transfer of data items via a smart network switch process. For example, if a requesting mobile device or a target mobile device changes networks during data item transfer between the mobile devices, then illustrative embodiments establish a same local network connection between the requesting mobile device and another matching target mobile device having that particular data item. Illustrative embodiments can leverage this information to prevent malware penetration into the entity's local network via mobile devices. Illustrative embodiments can also reduce time needed for automated data item updates or refresh by enabling effective peer-to-peer transfer of data items between registered mobile devices rather than downloading data items from a remote cloud-based network, which may take several minutes, for example.

With reference now to FIG. 3, a diagram illustrating an example of a mobile device data item transfer management system is depicted in accordance with an illustrative embodiment. Mobile device data item transfer management system 300 may be implemented in a network of data processing systems, such as network data processing system 100 in FIG. 1. Mobile device data item transfer management system 300 is a system of hardware and software components for controlling transfer of managed data items between mobile devices using a shared ledger of mobile device attribute or characteristics information.

In this example, mobile device data item transfer management system 300 includes remote cloud-based network 302 and local corporate network 304. Remote cloud-based network 302 may be, for example, a network corresponding to a remote cloud environment comprising a plurality of computing nodes that provides a mobile device management service. Local corporate network 304 may be, for example, a secure local area network corresponding to a particular enterprise or other type of entity, such as an organization, agency, or institution.

In this example, remote cloud-based network 302 includes mobile device management server 306 and content server 308. However, it should be noted that remote cloud-based network 302 may include any number of servers and other data processing systems and devices not shown. Mobile device management server 306 may be, for example, mobile device management server 104 or data processing system 200 in FIG. 2. Content server 308 may be, for example, content server 106 in FIG. 1.

Mobile device management server 306 includes mobile device manager 310, device data item inventory manager 312, and shared ledger 314. Shared ledger 314 consists of a plurality of block entries, such as block entry 316. Block entry 316 may be, for example, block entry 230 in FIG. 2. Content server 308 stores managed data items 318, which may include one or more of applications, documents, files, media content, data, and the like.

In this example, local corporate network 304 includes mobile device 320 and target mobile device 322. However, it should be noted that local corporate network 304 may include any number of mobile devices and other data processing systems and devices not shown. Mobile device 320 and target mobile device 322 may be, for example, registered client 110 and registered client 112 in FIG. 1. Mobile device 320 and target mobile device 322 include transfer agent 324 and transfer agent 326, respectively. Mobile device manager 310 installs transfer agent 324 on mobile device 320 and transfer agent 326 on target mobile device 322 during a mobile device registration process.

In this example, mobile device manager 310 initiates a managed data item push to mobile device 320. Mobile device manager 310 may initiate the managed data item push to mobile device 320 due to, for example, an identified software vulnerability discovered in mobile device 320. Mobile device manager 310 contacts device inventory manager 312 to identify which registered mobile devices already have the managed data item (i.e., software update or patch for the discovered vulnerability) for push to mobile device 320. Device inventory manager 312 performs a search of shared ledger 314 and retrieves a list of target mobile devices already having the managed data item. Device inventory manager 312 then passes the list of target mobile devices to mobile device manager 310.

After receiving the list, mobile device manager 310 determines a best matching target mobile device, which in this example is target mobile device 322, based on geographic location of mobile device 322, proximity of mobile device 322 to mobile device 320, and connectivity of mobile device 322 to the same secure local network as mobile device 320 (i.e., local corporate network 304). Mobile device manager 310 may also take into account other factors, such as, for example, make and model, operating system, processor, memory, storage, and the like corresponding to target mobile device 322, when determining whether target mobile device 322 is the best matching target mobile device. Mobile device manager 310 instructs transfer agent 324 to send data item transfer request 328 to transfer agent 326 to send the managed data item, which in this example is data item 330. In response to receiving data item transfer request 328, transfer agent 326 sends data item 330 to mobile device 320 via local corporate network 304. Mobile device 320 records the transfer of data item 330 in shared ledger 314 via shared ledger update 332.

Figure 4:
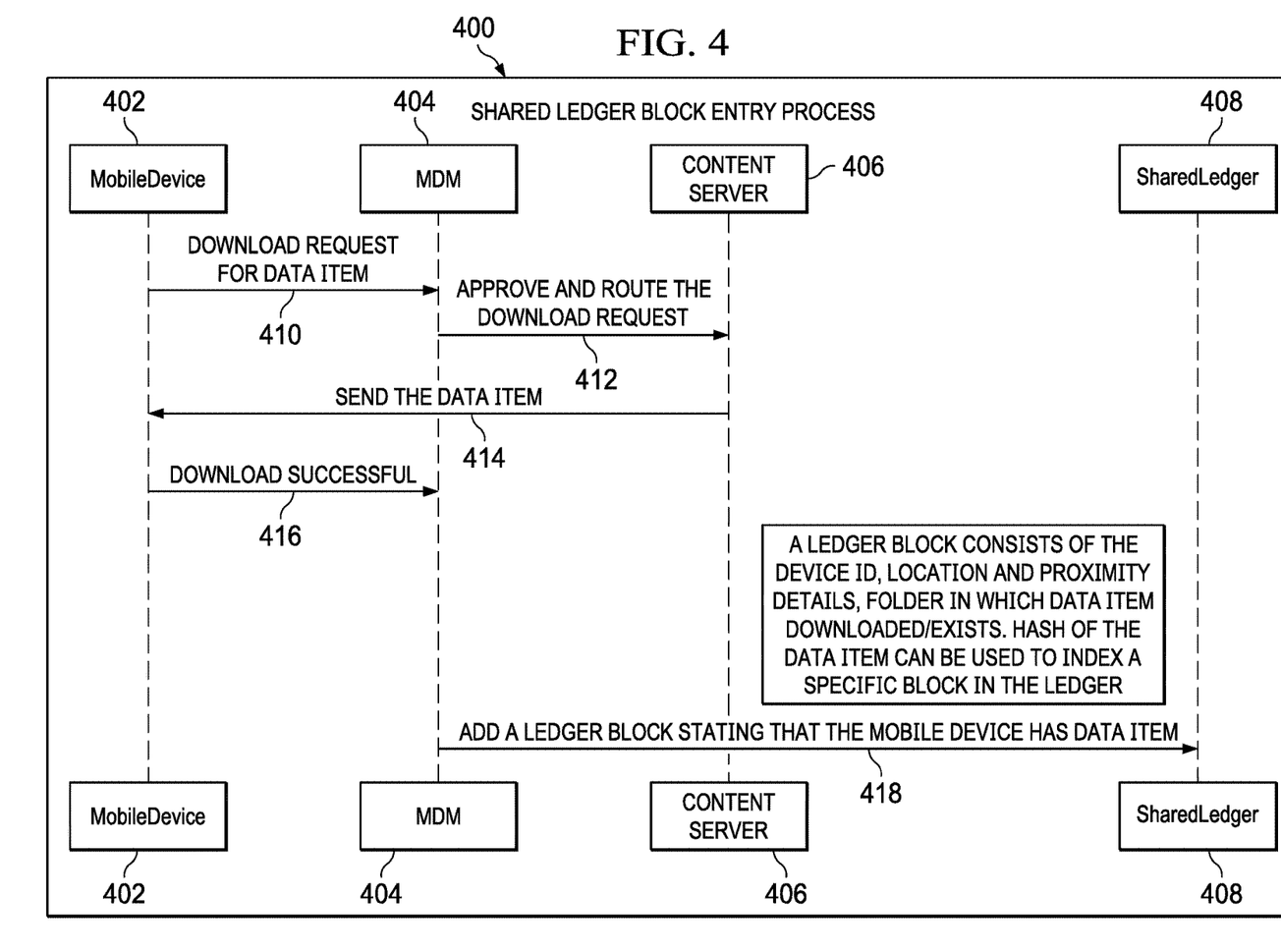
FIG. 4 is a diagram illustrating an example of a shared ledger block entry process in accordance with an illustrative embodiment.

With reference now to FIG. 4, a diagram illustrating an example of a shared ledger block entry process is depicted in accordance with an illustrative embodiment. Shared ledger block entry process 400 may be implemented in a network of data processing systems, such as network data processing system 100 in FIG. 1. In this example, shared ledger block entry process 400 includes mobile device 402, mobile device manager 404, content server 406, and shared ledger 408, such as mobile device 320, mobile device manager 310, content server 308, and shared ledger 314 in FIG. 3.

At 410, mobile device 402 sends a download request for a data item to mobile device manager 404. At 412, mobile device manager 404 approves and routes the data item download request to content server 406. At 414, content server 406 sends the data item to mobile device 402.

At 416, mobile device 402 sends a download successful notification to mobile device manager 404. At 418, mobile device manager 404 adds a ledger block, such as block entry 316 in FIG. 3, to shared ledger 408 stating that mobile device 402 now has the data item. The ledger block may consist of mobile device identifier, geolocation and proximity details, and folder in which the data item exists, for example.

Figure 5:
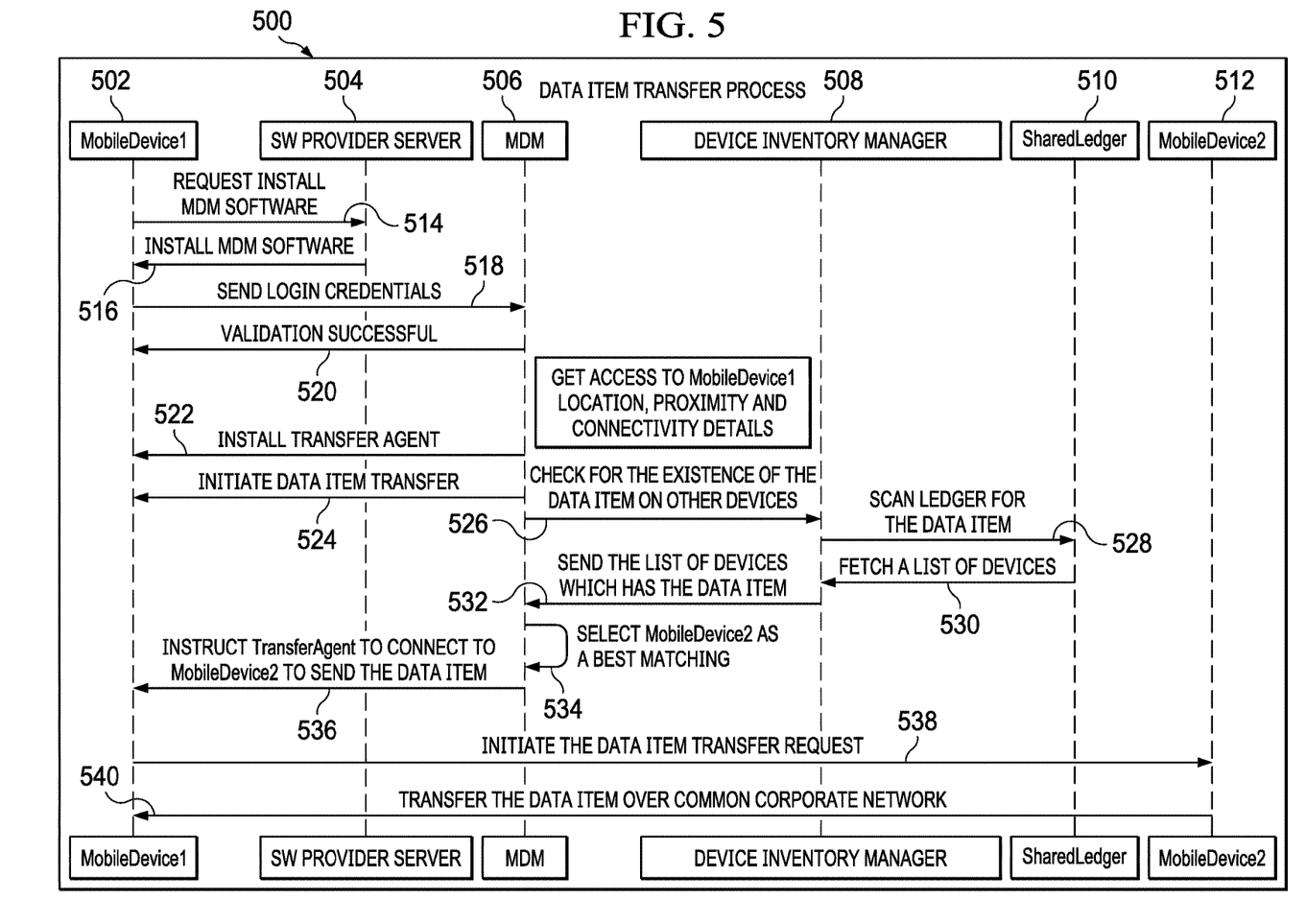
FIG. 5 is a diagram illustrating an example of a data item transfer process in accordance with an illustrative embodiment.

With reference now to FIG. 5, a diagram illustrating an example of a data item transfer process is depicted in accordance with an illustrative embodiment. Data item transfer process 500 may be implemented in a network of data processing systems, such as network data processing system 100 in FIG. 1. In this example, data item transfer process 400 includes mobile device 1 502, software provider server 504, mobile device manager 506, device inventory manager 508, shared ledger 510, and mobile device 2 512. Mobile device 1 502, mobile device manager 506, device inventory manager 508, shared ledger 510, and mobile device 2 512 may be, for example, mobile device 320, mobile device manager 310, device inventory manager 312, shared ledger 314, and target mobile device 322 in FIG. 3.

At 514, mobile device 1 502 sends a request to install mobile device management software to software provider server 504. In response, at 516, software provider server 504 installs the mobile device management software on mobile device 502. At 518, mobile device 1 502 sends login credentials to mobile device manager 506 for validation. At 520, mobile device manager 506 sends a validation successful notification to mobile device 1 502 and accesses location, proximity, and connectivity details corresponding to mobile device 1 502.

Further, at 522, mobile device manager 506 installs a transfer agent, such as transfer agent 324 in FIG. 3, on mobile device 1 502. At 524, mobile device manager 506 also initiates a data item transfer for mobile device 1 502. At 526, mobile device manager 506 directs device inventory manager 508 to check for the existence of the data item on other registered mobile devices.

At 528, device inventory manager 508 scans shared ledger 510 for registered mobile devices already containing the data item. At 530, device inventory manager 508 fetches a list of target mobile devices already containing the data item based on the scan. At 532, device inventory manager 508 sends the list of target mobile devices having the data item to mobile device manager 506.

At 534, mobile device manager 506 selects mobile device 2 512 as a best matching target mobile device from the list based on attributes of mobile device 2 512. At 536, mobile device manager 506 instructs the transfer agent on mobile device 1 502 to connect to the transfer agent on mobile device 2 512 to send the data item to mobile device 1 502 from mobile device 2 512. At 538, mobile device 1 502 initiates a request to transfer the data item from mobile device 2 512 to mobile device 1 502. At 540, mobile device 2 512 transfers the data item to mobile device 1 502 via a local corporate network, such as local corporate network 304 in FIG. 3, using a peer-to-peer protocol.

Figure 6:
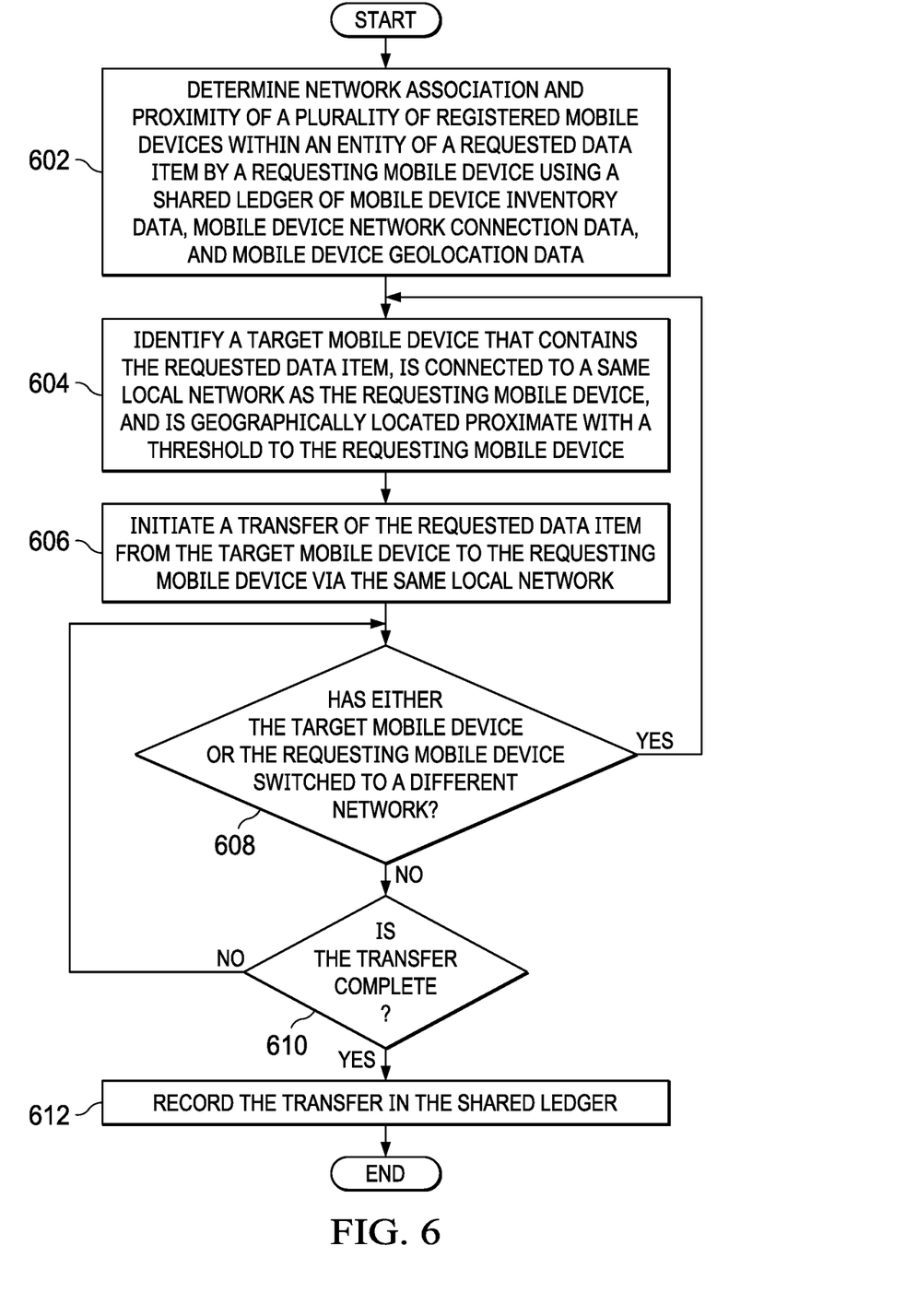
FIG. 6 is a flowchart illustrating a process for performing data item transfer between mobile devices in accordance with an illustrative embodiment.

With reference now to FIG. 6, a flowchart illustrating a process for performing data item transfer between mobile devices is shown in accordance with an illustrative embodiment. The process shown in FIG. 6 may be implemented in a computer, such as, for example, server 104 in FIG. 1 or data processing system 200 in FIG. 2.

The process begins when the computer determines network association and proximity of a plurality of registered mobile devices within an entity of a requested data item by a requesting mobile device using a shared ledger of mobile device inventory data, mobile device network connection data, and mobile device geolocation data (step 602). The computer identifies a target mobile device that contains the requested data item, is connected to a same local network as the requesting mobile device, and is geographically located proximate with a threshold to the requesting mobile device based on the determined network association and proximity of the plurality of registered mobile devices and the data in the shared ledger (step 604). Proximate with a threshold means that the target mobile device is geographically located within a defined threshold distance of the requesting mobile device. The computer initiates a transfer of the requested data item from the target mobile device to the requesting mobile device via the same local network based on mobile device management policies (step 606).

The computer makes a determination as to whether either the target mobile device or the requesting mobile device has switched to a different network (step 608). If the computer determines that either the target mobile device or the requesting mobile device has switched to a different network, yes output of step 608, then the process returns to step 604 where the computer identifies another target mobile device in the same local network as the requesting mobile device. If the computer determines that neither the target mobile device nor the requesting mobile device has switched to a different network, no output of step 608, then the computer makes a determination as to whether the transfer of the requested data item is complete (step 610).

If the computer determines that the transfer of the requested data item is incomplete, no output of step 610, then the process returns to step 608 where the computer continues to determine whether either mobile device has switched to a different network. If the computer determines that the transfer of the requested data item is complete, yes output of step 610, then the computer records the transfer of the requested data item to the requesting mobile device in a block entry of the shared ledger (step 612). Thereafter, the process terminates.

Figure 7:
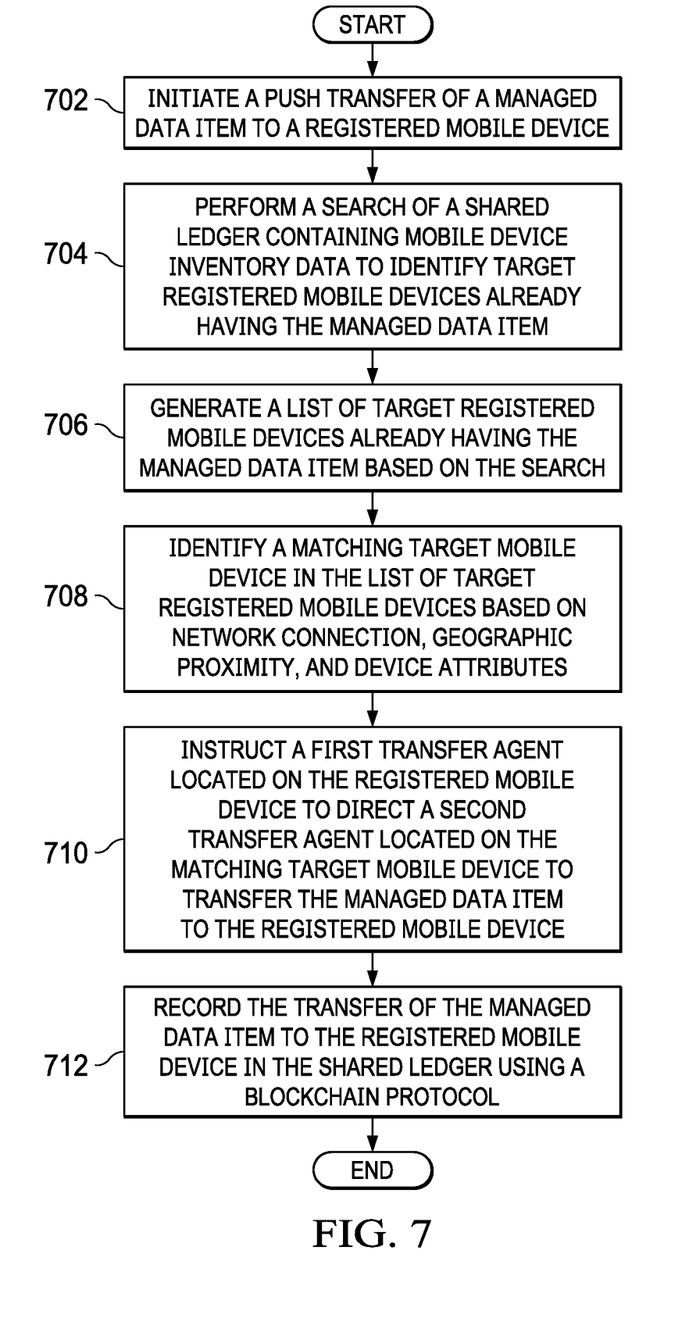
FIG. 7 is a flowchart illustrating a process for instructing a transfer agent to transfer a managed data item to another mobile device in accordance with an illustrative embodiment.

With reference now to FIG. 7, a flowchart illustrating a process for instructing a transfer agent to transfer a managed data item to another mobile device is shown in accordance with an illustrative embodiment. The process shown in FIG. 7 may be implemented in a computer, such as, for example, server 104 in FIG. 1 or data processing system 200 in FIG. 2.

The process begins when the computer initiates a push transfer of a managed data item to a registered mobile device (step 702). In addition, the computer performs a search of a shared ledger containing mobile device inventory data to identify target registered mobile devices already having the managed data item (step 704). Further, the computer generates a list of target registered mobile devices already having the managed data item based on the search of the shared ledger (step 706).

The computer identifies a matching target mobile device in the list of target registered mobile devices based on network connection, geographic proximity, and device attributes (step 708). The computer instructs a first transfer agent located on the registered mobile device to direct a second transfer agent located on the matching target mobile device to transfer the managed data item to the registered mobile device via a secure local network using a peer-to-peer protocol (step 710). The computer records the transfer of the managed data item to the registered mobile device in the shared ledger using a blockchain protocol (step 712). Thereafter, the process terminates.

Thus, illustrative embodiments of the present invention provide a computer-implemented method, computer system, and computer program product for optimizing data item transfer between registered mobile devices based on mobile device attributes stored in a shared ledger. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data item transfer between mobile devices registered with a mobile device management server, the method comprising:
   determining, by the mobile device management server, network association and proximity of a plurality of mobile devices of a requested data item by a requesting mobile device using a shared ledger comprising mobile device inventory data, mobile device network connection data, and mobile device geolocation data;
   identifying, by the mobile device management server, a target mobile device that contains the requested data item, is connected to a same local network as the requesting mobile device, and is geographically located proximate with a threshold to the requesting mobile device based on the determined network association and proximity of the plurality of mobile devices and data in the shared ledger;
   initiating, by the mobile device management server, a transfer of the requested data item from the target mobile device to the requesting mobile device via the same local network based on mobile device management policies;
   instructing, by the mobile device management server, a first transfer agent located on the requesting mobile device to direct a second transfer agent located on the target mobile device to transfer the requested data item to the requesting mobile device using a peer-to-peer protocol, wherein the mobile device management server has administrative privileges on the requesting mobile device via the first transfer agent located on the requesting mobile device; and
   responsive to determining that the requested data item was successfully transferred to requesting mobile device, recording, by the mobile device management server, the transfer of the requested data item to the requesting mobile device in a block entry of the shared ledger.

2. The method of claim 1 further comprising:
   determining whether the target mobile device or the requesting mobile device switched to a different network; and
   responsive to determining that the target mobile device or the requesting mobile device switched to a different network, identifying another target mobile device in the same local network as the requesting mobile device.

3. The method of claim 1,
   wherein the shared ledger comprises attribute data that includes information corresponding to the mobile devices registered with the mobile device management server, geolocation data that identifies a current geographic location of the mobile devices registered with the mobile device management server, inventory data that identifies managed data items which can be transferred between registered mobile devices, and network connection data that identifies a local network that the mobile devices registered with the mobile device management server are connected to.

4. The method of claim 3 further comprising:
   the mobile device management server utilizing a device inventory manager to generate a list of target mobile devices already having the requested data item based on a search of the shared ledger; and
   identifying, by the mobile device management server, a matching target mobile device in the list of target mobile devices already having the requested data item based on network connection, geographic proximity, and device attributes identified in the shared ledger.

5. The method of claim 1 further comprising:
   receiving, by the mobile device management server, a shared ledger update associated with the transfer of the requested data item from the first transfer agent; and
   recording, by the mobile device management server, the transfer of the requested data item to the requesting mobile device in the shared ledger using a blockchain protocol.

6. The method of claim 1, wherein the same local network is a secure corporate local area network corresponding to a particular entity that owns the requested data item, and wherein at least one given mobile transfer policy of the mobile device transfer policies specifies that a given data item may only be transferred between certain of the plurality of mobile devices when the certain of the plurality of mobile devices are connected to the secure corporate local area network at specified dates and times.

7. The method of claim 1, wherein the mobile device management policies identify how, when and where transfer of a particular data item may occur between specified ones of the mobile devices registered with the mobile device management server.

8. A computer system for data item transfer between mobile devices, the computer system comprising:
   a bus system;
   a storage device connected to the bus system, wherein the storage device stores program instructions; and
   a processor connected to the bus system, wherein the processor executes the program instructions to:
   determine network association and proximity of a plurality of mobile devices of a requested data item by a requesting mobile device using a shared ledger comprising mobile device inventory data, mobile device network connection data, and mobile device geolocation data;
   identify a target mobile device that contains the requested data item, is connected to a same local network as the requesting mobile device, and is geographically located proximate with a threshold to the requesting mobile device based on the determined network association and proximity of the plurality of mobile devices and data in the shared ledger;
initiate a transfer of the requested data item from the target mobile device to the requesting mobile device via the same local network based on mobile device management policies;
instruct a first transfer agent located on the requesting mobile device to direct a second transfer agent located on the target mobile device to transfer the requested data item to the requesting mobile device using a peer-to-peer protocol, wherein the mobile device management server has administrative privileges on the requesting mobile device via the first transfer agent located on the requesting mobile device; and
responsive to determining that the requested data item was successfully transferred to requesting mobile device, record the transfer of the requested data item to the requesting mobile device in a block entry of the shared ledger.

9. The computer system of claim 8, wherein the processor further executes the program instructions to:
determine whether the target mobile device or the requesting mobile device switched to a different network; and
identify another target mobile device in the same local network as the requesting mobile device in response to determining that the target mobile device or the requesting mobile device switched to a different network.

10. The computer system of claim 8,
wherein the shared ledger comprises attribute data that includes information corresponding to the mobile devices registered with the mobile device management server, geolocation data that identifies a current geographic location of the mobile devices registered with the mobile device management server, inventory data that identifies managed data items which can be transferred between registered mobile devices, and network connection data that identifies a local network that the mobile devices registered with the mobile device management server are connected to.

11. The computer system of claim 10, wherein the processor further executes the program instructions to:
generate a list of target mobile devices already having the requested data item based on a search of the shared ledger; and
identify a matching target mobile device in the list of target mobile devices already having the requested data item based on network connection, geographic proximity, and device attributes identified in the shared ledger.

12. The computer system of claim 8, wherein the processor further executes the program instructions to:
receive a shared ledger update associated with the transfer of the requested data item from the first transfer agent; and
record the transfer of the requested data item to the requesting mobile device in the shared ledger using a blockchain protocol.

13. A computer program product for data item transfer between mobile devices registered with a mobile device management server, the computer program product comprising a computer readable storage medium having program instructions embodied therewith, the program instructions executable by a computer to cause the computer to perform a method comprising:

determining, by the mobile device management server, network association and proximity of a plurality of mobile devices of a requested data item by a requesting mobile device using a shared ledger comprising mobile device inventory data, mobile device network connection data, and mobile device geolocation data;
identifying, by the mobile device management server, a target mobile device that contains the requested data item, is connected to a same local network as the requesting mobile device, and is geographically located proximate with a threshold to the requesting mobile device based on the determined network association and proximity of the plurality of mobile devices and data in the shared ledger;
initiating, by the mobile device management server, a transfer of the requested data item from the target mobile device to the requesting mobile device via the same local network based on mobile device management policies;
instructing, by the mobile device management server, a first transfer agent located on the requesting mobile device to direct a second transfer agent located on the target mobile device to transfer the requested data item to the requesting mobile device using a peer-to-peer protocol, wherein the mobile device management server has administrative privileges on the requesting mobile device via the first transfer agent located on the requesting mobile device; and
responsive to determining that the requested data item was successfully transferred to requesting mobile device, recording, by the mobile device management server, the transfer of the requested data item to the requesting mobile device in a block entry of the shared ledger.

14. The computer program product of claim 13 further comprising:
determining whether the target mobile device or the requesting mobile device switched to a different network; and
responsive to determining that the target mobile device or the requesting mobile device switched to a different network, identifying another target mobile device in the same local network as the requesting mobile device.

15. The computer program product of claim 13,
wherein the shared ledger comprises attribute data that includes information corresponding to the mobile devices registered with the mobile device management server, geolocation data that identifies a current geographic location of the mobile devices registered with the mobile device management server, inventory data that identifies managed data items which can be transferred between registered mobile devices, and network connection data that identifies a local network that the mobile devices registered with the mobile device management server are connected to.

16. The computer program product of claim 15 further comprising:
the mobile device management server utilizing a device inventory manager to generate a list of target mobile devices already having the requested data item based on a search of the shared ledger; and
identifying, by the mobile device management server, a matching target mobile device in the list of target mobile devices already having the requested data item based on network connection, geographic proximity, and device attributes identified in the shared ledger.

17. The computer program product of claim 13 further comprising:

receiving, by the mobile device management server, a shared ledger update associated with the transfer of the requested data item from the first transfer agent; and recording, by the mobile device management server, the transfer of the requested data item to the requesting mobile device in the shared ledger using a blockchain protocol.

18. The computer system of claim 8, wherein the same local network is a secure corporate local area network corresponding to a particular entity that owns the requested data item, and wherein at least one given mobile transfer policy of the mobile device transfer policies specifies that a given data item may only be transferred between certain of the plurality of mobile devices when the certain of the plurality of the plurality of mobile devices are connected to the secure corporate local area network at specified dates and times.

19. The computer program product of claim 13, wherein the same local network is a secure corporate local area network corresponding to a particular entity that owns the requested data item, and wherein at least one given mobile transfer policy of the mobile device transfer policies specifies that a given data item may only be transferred between certain of the plurality of mobile devices when the certain of the plurality of the plurality of mobile devices are connected to the secure corporate local area network at specified dates and times.

20. The method of claim 1 further comprising:

installing, by the mobile device management server, the first transfer agent on the requesting mobile device during a mobile device registration process.

* * * * *